United States Patent
Holechovsky et al.

(10) Patent No.: US 6,780,895 B2
(45) Date of Patent: Aug. 24, 2004

(54) POLYURETHANE CARPET BACKINGS WITH IMPROVED TUFT BIND

(75) Inventors: Ulrich B. Holechovsky, Chester Springs, PA (US); David Gibala, Downingtown, PA (US); Jeffrey L. Robbins, Phoenixville, PA (US); Robert D. Duffy, West Chester, PA (US)

(73) Assignee: Bayer Antwerp, N.V., Antwerp (BE)

( * ) Notice: Subject to any disclaimer, the term of this patent is extended or adjusted under 35 U.S.C. 154(b) by 0 days.

(21) Appl. No.: 10/218,826

(22) Filed: Aug. 14, 2002

(65) Prior Publication Data

US 2003/0114627 A1 Jun. 19, 2003

Related U.S. Application Data

(60) Continuation of application No. 09/690,502, filed on Oct. 17, 2000, now abandoned, which is a division of application No. 09/114,363, filed on Jul. 14, 1998, now Pat. No. 6,171,678.

(51) Int. Cl.$^7$ ................................................ C08G 18/48
(52) U.S. Cl. ...................... 521/133; 521/174; 521/176; 428/95; 428/97; 156/78
(58) Field of Search ................................. 521/133, 174, 521/176; 428/95, 97; 156/78

(56) References Cited

U.S. PATENT DOCUMENTS

| | | | |
|---|---|---|---|
| 4,696,849 A | | 9/1987 | Mobley et al. |
| 4,853,054 A | | 8/1989 | Turner et al. |
| 5,158,922 A | | 10/1992 | Hinney et al. |
| 5,482,908 A | | 1/1996 | Le-Khac |
| 5,604,267 A | | 2/1997 | Duffy |
| 6,022,903 A | * | 2/2000 | Younes et al. |
| 6,171,678 B1 | * | 1/2001 | Holeschovsky et al. |

* cited by examiner

*Primary Examiner*—Rachel Gorr
(74) *Attorney, Agent, or Firm*—Joseph C. Gil; N. Denise Brown

(57) ABSTRACT

Improvements in tuft bind and/or elongation of tufted carpet may be achieved by selecting, as components of a tuft bind adhesive, one or more of: i) a polyol component comprising a low or ultra-low unsaturation polyoxypropylene polyol optionally containing up to 30 weight percent oxyethylene moieties, and ii) a chain extender component comprising 2-methyl-1,3-propanediol.

30 Claims, No Drawings

POLYURETHANE CARPET BACKINGS WITH IMPROVED TUFT BIND

CROSS-REFERENCE TO RELATED APPLICATIONS

This application is a Continuation of U.S. application Ser. No. 09/690,502, filed Oct. 17, 2000, now abandoned, which is a Divisional of U.S. application Ser. No. 09/114,363, filed Jul. 14, 1998, which issued as U.S. Pat. No. 6,171,678 on Jan. 9, 2001.

TECHNICAL FIELD

The present invention pertains to tufted carpeting with improved tuft bind and cracking resistance characteristics. More particularly, the present invention pertains to reactive polyurethane formulations which can be used to prepare tufted carpet with improved tuft bind while retaining good carpet feel and resistance to cracking.

DESCRIPTION OF THE RELATED ART

Tufted carpeting is manufactured by tufting yarns into a woven primary backing. The tufts are secured by applying at least one adhesive formulation to the primary backing side of the carpet/primary backing ("greige good"). In the past, SBR latexes have seen widespread use as adhesives for such purposes. However, such latexes have numerous drawbacks. First, neither the hydrolytic stability nor the durability of the cured elastomer is entirely satisfactory. Second, as the latex is applied in the form of an aqueous dispersion, considerable energy is expended in evaporating the aqueous component.

Polyurethanes have been considered as alternatives to SBR latex. Polyurethanes, in general, exhibit greater chemical and physical stability as compared to SBR latexes. Furthermore, polyurethanes may be applied either as an expandable or as a frothed foam, and may perform the dual function of tuft binding and cushioning. However, acceptable polyurethane systems have been difficult to formulate to achieve balanced properties. For example, tuft bind is known to be improved by increasing the hard segment content of the polyurethane polymer. However, increased hard segment content decreases the elastomer elongation, and alters both the feel of the carpet as well as its resistance to "cracking" when rolled.

U.S. Pat. Nos. 4,696,849 and 4,853,054 attest to the difficulties experienced in preparing polyurethane carpet backings. In U.S. Pat. No. 4,696,849, for example, improvements in the tuft bind are achieved by use of two distinct high primary hydroxyl polyols, one having an actual functionality of 1.4–1.95 and a second having an actual functionality greater than 2.05, admixed such that the average functionality is within the very narrow range of 2.00±0.03. Tuft bind is said to be increased, but no comparative formulations are included to verify any increase. In the U.S. Pat. No. 4,853,054 patent, blends of polyoxyalkylene polyether diols and triols, each having an equivalent weight between 1000 Da and 5000 Da, and the blend having an average actual functionality between 1.8 and 2.2, are used in conjunction with a polyisocyanate having a functionality between 1.9 and 2.4. Carpet splits are said to be reduced by the latter formulations, although the effect on tuft bind is unclear. When precoat adhesives are used, the average actual polyol blend functionality range is yet more narrow.

In general, it has been found that in order to be suitable for use as a carpet backing adhesive, the elongation of the polyurethane is desirably greater than 60%, with higher values more desirable, although the range between 40% and 60% may be acceptable for certain carpet styles and the degree of bending expected. Elongations lower than 60% often result in excessive cracking when the carpet is rolled or bent, for example during installation. Elongation less than 40% is clearly unacceptable. The lower acceptable limit for tuft bind is approximately 12 lbs, again with higher values much desired. As tuft bind is influenced by numerous factors such as the yarn denier, the nature of the backing, and the number of tufts per inch, limiting the polyurethane formulation window to resin components with functionalities close to two unacceptably limits the formulation window and the carpet properties which may be achieved.

It would be desirable to increase the tuft bind in polyurethane-backed carpeting. It would be further desirable to increase tuft bind without decreasing elongation of the polyurethane polymer. However, the competing effects of increasing the hard segment content, necessary to increase tuft bind, and increasing elongation which requires decreased high hard segment content, have thus far been unable to be reconciled.

SUMMARY OF THE INVENTION

It has now been surprisingly discovered that increases in tuft bind and elongation may be achieved by substituting 2-methyl-1,3-propanediol for all or part of the chain extender portion of polyurethane carpet backing adhesives, and that improvements in elongation and hence, cracking resistance, can be obtained by substituting low unsaturation polyols for all or part of the polyol component. The use of low unsaturation polyols allows the hard segment content to be raised, thus increasing tuft bind. Surprisingly, use of low unsaturation polyols does not require that a polyol functionality close to 2 be maintained. Preferably, 2-methyl-1,3-propanediol and low unsaturation polyol components are used simultaneously to provide both exceptional tuft bind and elongation.

DESCRIPTION OF THE PREFERRED EMBODIMENTS

The tufted carpets of the subject invention are initially prepared in the conventional manner, the greige good being constructed by tufting yarns into a primary woven backing of jute, polypropylene, or the like. The primary backing side of the greige good is then contacted with the reactive polyurethane precoat adhesive, generally in the form of a frothed foam. If desired, two precoat adhesives, one being a lower density foam or liquid, non-foam precoat adhesive, preferably containing 2-methyl-1,3-propanediol as chain extender and low unsaturation polyol as the polyol component, may be applied to yet more effectively wet out the protruding tuft ends and achieve higher tuft bind.

The precoat adhesive(s) may be applied by conventional methods, including dipping, spraying, etc. Frothed foam may be supplied from a frothing apparatus, for example an Oakes or Firestone froth head. The thickness of the adhesives may be gauged by a doctor blade, roller, air blade, etc., all well known to the art. Preferably, the reactive polyurethane components are mixed in a high pressure mixhead prior to being introduced into the frothing head, and fillers, when used, introduced into the polyol side through an in-line mixer rather than being with polyol in a holding tank, all as disclosed in U.S. Pat. No. 5,604,267, which is herein incorporated by reference.

The reactive polyurethane systems comprise one or more di- or polyisocyanates (A-side), and a B-side which comprises one or more polyols, generally polyols having nominal functionalities of from 2 to 8, a low molecular weight chain extender, one or more polyurethane-promoting catalysts, and optionally suitable surfactants, crosslinkers, plasticizers, pigments, and other well known polyurethane additives. In general, a filler is also employed, particularly in froth foam.

The di- and polyisocyanates which are useful include the conventionally used isocyanates such as toluene diisocyanate, including the 2,4- and 2,6-isomers individually or in any admixture, preferably in the common 65/35 and 80/20 mixtures; methylene diphenylene diisocyanates (MDI), in the form of the individual 2,2'-, 2,4'-, and 4,4,'-isomers, and mixtures thereof; crude or polymeric MDI having a functionality greater than 2 and comprising mixtures of 2-ring diisocyanates and their higher ring polyfunctional analogs; aliphatic diisocyanates such as 2,4- and 2,6-methylcyclohexane diisocyanate (hydrogenated TDI); 2,2'-, 2,4'-, and 4,4'-dicyclohexylmethane diisocyanates and mixtures of these isomers (hydrogenated MDI); 1,6-hexane diisocyanate, isophorone diisocyanate; and urethane, urea, biuret, uretonimine, uretdione, carbodiimide, isocyanurate, and allophanate modified isocyanates. TDI and MDI or their admixtures are preferred, either as individual isomers or as mixtures.

Isocyanate-terminated prepolymers and quasi-prepolymers are also useful. Isocyanate-terminated prepolymers are prepared by reacting a stoichiometric excess of one or more di- or polyisocyanates with a polyoxyalkylene polyol having a functionality of 2 or higher and an equivalent weight greater than 300 Da (Daltons). Molecular weights and equivalent weights herein are number average molecular and equivalent weights unless indicated otherwise. The isocyanate-terminated prepolymers and quasi-prepolymers advantageously have free isocyanate contents of from about 6% by weight to about 30% by weight. Prepolymers and quasi-prepolymers may be used in conjunction with other isocyanates as a blend.

The polyol component may, in the case where 2-methyl-1,3-propanediol is used as the chain extender, be any suitable polyurethane grade polyol, such as hydroxyl-functional polyester diols, polytetramethylene ether glycols, polycaprolactone diols, and the like, but preferably comprises one or more substantially polyoxypropylene polyols, preferably those which are copolymers with ethylene oxide to provide high primary hydroxyl content. Most preferably, the polyol component comprises, in major part, more preferably in most major part, and most preferably substantially all, of one or more low unsaturation polyoxypropylene polyols having unsaturation levels of less than 0.015 meq/g, preferably less than 0.010 meq/g, and most preferably less than 0.007 meq/g, all as determined by ASTM D 2849–69 "Testing Urethane Foam Polyol Raw Materials." Polymer polyols, e.g. those containing in situ polymerized vinyl monomers such as styrene and acrylonitrile, and polymer-modified polyols such as PIPA, PID, and PUD polyols may also be used. Preferably, all the polyols of the polyol component are low unsaturation polyols, or are polymer or polymer-modified polyols based on low unsaturation polyols, and most preferably all are ultra-low unsaturation polyols or polymer polyols based thereon, with an average intrinsic unsaturation in the polyol blend of less than 0.010 meq/g, and more preferably less than 0.007 meq/g. Intrinsic unsaturation is defined as the unsaturation which is unavoidably produced during polyoxyalkylene polyol synthesis.

The low and ultra-low unsaturation polyols useful in the present invention may have nominal functionalities between 2 and 8, more preferably between 2 and 6, and most preferably from 2 and 3. The polyols may be homopolymeric polyoxypropylene polyols, but are preferably copolymeric polyoxypropylene/polyoxyethylene polyols. In these copolymeric polyols, oxyethylene moieties may be randomly distributed, or may be in block or block random form. Polyols having terminal oxypropylene/oxyethylene blocks of high oxyethylene content or polyoxyethylene capped polyols are particularly suitable. Most preferably, the polyols are polyoxypropylene copolymer polyols containing random internal oxyethylene moieties with a finish of high oxyethylene content or all oxyethylene moieties. The total oxyethylene content should, in general, be less than 35 weight percent. The low and ultra-low unsaturation polyols may be prepared as taught in U.S. Pat. Nos. 5,470,812, 5,482,908, 5,545,601, 5,158,922, and 5,689,012, which are herein incorporated by reference. Such polyols are available commercially from the ARCO Chemical Company, for example under the trade name ACCLAIM™ polyether polyols.

The actual functionalities of low and ultra-low unsaturation polyols are close to the respective nominal functionalities. For ultra-low unsaturation polyols, for example, the actual functionality of a polyoxypropylene diol with a nominal functionality of 2 is ordinarily about 1.95 or greater, whereas the functionality of an analogous triol is ordinarily about 2.80 or greater. The average functionality of the polyol blends of the subject invention should range from 1.9 to about 3, more preferably 1.95 to about 2.6, and most preferably about 1.95 to about 2.4. These average functionalities are based on actual functionalities. The polyol functionalities useful will depend to some degree on the functionality of the isocyanate, with polyol functionalities in the higher portion of the range suitable with isocyanates with functionalities close to 2, and the lower portion of the range most suitable with isocyanates having a higher functionality, for example in the range of 2.2 to 2.4 or higher. The polyols advantageously have equivalent weights of 800 Da to 5000 Da, more preferably 1000 Da to 4000 Da, and most preferably 1000 Da to 2500 Da.

The chain extenders useful in the subject invention are advantageously isocyanate-reactive compounds bearing between 2 and 3 isocyanate-reactive groups per molecule, and an equivalent weight ranging from about 31 Da to about 250 Da. Most preferably, the isocyanate-reactive groups are hydroxyl groups, although other groups well known to those skilled in the polyurethane arts, such as amino groups, may also be used. Preferred chain extenders are low equivalent weight diols such as ethylene glycol, diethylene glycol, triethylene glycol, propylene glycol, dipropylene glycol, tripropylene glycol, 1,3-propanediol, 1,4-butane diol, 1,6-hexanediol, 2,2,4-trimethylpentanediol, glycerine, and trimethylolpropane.

It has been surprisingly discovered that 2-methyl-1,3-propanediol is a particularly excellent chain extender, yielding increases in tuft bind and/or elongation when used alone or in conjunction with other chain extenders. When used with other chain extenders, 2-methyl-1,3-propanediol preferably constitutes 20% or more by weight of the chain extender component, more preferably 30% or more by weight, and yet more preferably, constitutes a major portion of the chain extender. The chain extender component, when used, may be employed in amounts of greater than 0 to 0.5 parts by weight per part by weight of the polyol component, more preferably 0.05 to 0.4 parts by weight, and more preferably about 0.1 to about 0.3 parts by weight, these parts by weight based on a chain extender equivalent weight of about 50 Da. Higher and lower equivalent weights will generally necessitate larger and smaller proportions of chain extender, respectively.

The compositions are normally catalyzed by urethane promoting catalysts, e.g. those which accelerate the reaction of isocyanate groups with hydroxyl groups. Conventional tin catalysts and amine catalysts are useful, for example, either singly or in admixture. Examples are tin catalysts such as tin octoate, dimethyltin diacetate, diethyltin diacetate, dibutyltin diacetate, dibutyltin dilaurate, among others; and amine catalysts such as diethylene triamine and triethylene diamine. Other catalysts such as the various transition metal acetylacetonates, bismuth compounds, and the like may also be used. Latent catalysts which do not become active until heated are also useful, either alone or in combination with other conventional catalysts.

Fillers are generally used, in both precoat formulations as well as cushioning foam formulations. The fillers may be selected from those traditionally used, for example finely divided, ground, precipitated or microcrystalline fillers such as aluminum hydroxide, felspar, dolomite, calcium carbonate, limestone, and wollastonite, among others. Mixtures of aluminum hydroxide and calcium carbonate, the latter often in the form of finely ground limestone, are preferred. The fillers are generally employed in amounts of 50 parts to 350 parts per 100 parts polyol, more preferably 100 parts to 300 parts, these parts being parts by weight. In attached foam cushioning, the amount of filler is generally less, i.e., on the order of 100 parts.

When the adhesive is to be used in the form of a foam, either a blown foam or a froth foam or combinations thereof may be used. Froth foams are preferred. Blowing agents in blown and froth/blown foams may be selected from those conventionally used, including fluorochlorocarbons, in particular R-22 (dichlorodifluoromethane), but are more preferably low boiling hydrocarbons, ketones, ethers, carbonates, or the like, and most preferably is water, either alone or in conjunction with another blowing agent. Solid blowing agents may also be useful but are not preferred.

Froth foams are preferably prepared as disclosed in U.S. Pat. No. 5,604,267. Froth foams may also be prepared in the conventional manner by introducing the reactive ingredients together with a substantially inert gas such as air, nitrogen, argon, carbon dioxide, or the like, into a froth mixer such as an Oakes or Firestone mixer. Froth and blown/froth foams are generally gauged with a doctor blade or roller, or the like, to the desired thickness. Blown foams are often similarly gauged initially, but are generally thicknessed by a belt coated with a release agent or by an embossed roller after the foam has cured to the stage where it is still partially uncured but non-tacky. Frothed foams may also include a volatile or reactive blowing agent in addition to being mechanically frothed.

Pigments may be added when desired to impart color to the polyurethane adhesive. Pigments, which are used in most minor amounts, e.g. less than 2% by weight, should be considered distinct from fillers which are used in far larger amounts and for a different purpose. Plasticizers and other ingredients may be added as desired, as well as crosslinkers such as triethanolamine and diethanolamine.

A secondary backing may be applied to the polyurethane adhesive while still wet, or may be applied after cure using a further adhesive. Preferred secondary backings are constructed of jute or polypropylene.

Having generally described this invention, a further understanding can be obtained by reference to certain specific examples which are provided herein for purposes of illustration only and are not intended to be limiting unless otherwise specified.

In the Examples which follow:

Polyol A is an ultra-low unsaturation, 1100 Da equivalent weight polyoxypropylene diol having a 25 weight percent polyoxyethylene cap, an unsaturation of 0.0063 meq/g, and an actual functionality of 1.98;

Polyol B is a conventionally catalyzed, glycerine initiated polyol with an unsaturation of 0.04 meq/g, a nominal functionality of 3, an actual functionality of 2.6, and an equivalent weight of 1550 Da;

Polyol C is a conventionally catalyzed polyoxypropylene diol with a 15 weight percent polyoxyethylene cap, an unsaturation of 0.04 meq/g, an equivalent weight of 1400 Da, and an actual functionality of 1.8;

Polyol D is an ultra-low unsaturation glycerine initiated polyoxypropylene triol containing a 10 weight percent random internal polyoxyethylene moieties, having an unsaturation of 0.0044 meq/g, an equivalent weight of 1200 Da, a nominal functionality of 3, and an actual functionality of 2.84;

Polyol E is an ultra-low unsaturation analog of polyol c having an equivalent weight of 1400 Da, a 15 weight percent polyoxyethylene cap, a nominal functionality of 2, an unsaturation of 0.0059 meq/g, and an actual functionality of 1.97;

MPDiol™ glycol, a product of ARCO Chemical, is 2-methyl-1,3-propanediol;

"DEG" is diethylene glycol;

LC 5615 is a polyurethane catalyst available from Witco; and

Baytuft® 751 is a hard segment MDI prepolymer with a free isocyanate content of 27.5% by weight and an estimated functionality of 2.2 available from Bayer.

Isonate® 143L is a polycarbodiimide-modified MDI with a free NCO content of 29.2 wt. %, a product of Dow Chemical.

Testing of tuft bind and elongation follows conventional methodology. Tuft bind is measured in accordance with ASTM D 1335-67 (Reapproved, 1972), "Standard Test Method for Tuft Bind of Pile Floor Coverings." Elongation is measured in accordance with ASTM D 412-92, "Standard Test Methods for Vulcanized Rubber and Thermoplastic Rubbers and Thermoplastic Elastomers-Tension", using die cut Type A specimens. Tear strength is measured in accordance with ASTM D-624, using "Die C" specimens. Compression set is measured as described in ASTM D-395.

EXAMPLES 1 TO 8 AND COMPARATIVE EXAMPLES C1 AND C2

Polyurethane froth adhesives were prepared by frothing the ingredients listed in Table 1. The froths were applied to the reverse side of a 30 oz/yd$^2$ (1 kg/m$^2$) level loop carpet made of 1250 denier, 2-ply nylon fiber tufted through a woven polypropylene primary backing at 8×10 stitches per inch (~3×4 stitches per cm) in a straight stitch pattern. The polyol composition was adjusted to obtain an average actual polyol functionality close to 2 as taught by U.S. Pat. No. 4,853,054. Elongation was measured from pads made by pouring a portion of the froth into pans, and curing at 130° C. for 20 minutes. The formulations and results are

TABLE 1

| | Example | | | | | | | | | |
|---|---|---|---|---|---|---|---|---|---|---|
| | 1 | 2 | C1 | 3 | 4 | C2 | 5 | 6 | 7 | 8 |
| Component | | | | | | | | | | |
| Polyol A | 85.8 | — | — | 80.5 | — | — | 81 | 81 | — | — |
| Polyol B | — | — | 27.1 | — | — | 25.4 | — | — | — | — |
| Polyol C | — | — | 58.2 | — | — | 54.6 | — | — | — | — |
| Polyol E | — | 85.3 | — | — | 80 | — | — | — | 80.6 | 80.6 |
| Diethylene Glycol | 14.2 | 14.7 | 14.7 | 19.5 | 20 | 20 | — | — | — | — |
| 2-Methyl,1-3 propane diol | — | — | — | — | — | — | 19 | 19 | 19.4 | 19.4 |
| Calcium Carbonate | 150 | 150 | 150 | 150 | 150 | 150 | 150 | 150 | 150 | 150 |
| Wetting Agent | 1 | 1 | 1 | 1 | 1 | 1 | 1 | 1 | 1 | 1 |
| LC5615 | 1.5 | 1.5 | 1.5 | 1.5 | 1.5 | 1.5 | 1.5 | 1.5 | 1.5 | 1.5 |
| Baytuft 751 | 56 | 55 | 54.7 | 70.9 | 70.1 | 69.7 | 79.7 | 79.7 | 78.8 | 78.8 |
| Physical and Chemical Characteristics | | | | | | | | | | |
| Hard Segment Content % | 45 | 45 | 45 | 53 | 53 | 53 | 55 | 55 | 55 | 55 |
| Average Polyol Functionality | 1.98 | 1.97 | 1.98 | 1.98 | 1.97 | 1.98 | 1.98 | 1.98 | 1.97 | 1.97 |
| Applied Weight (oz/sq.yd.) | 35.1 | 35.3 | 32.7 | 34.1 | 36.7 | 33.1 | 38.9 | 29.2 | 34.2 | 25.8 |
| Tuft Bind (lbs.) | 14.2 | 13.7 | 13.0 | 17.5 | 17.7 | 15.2 | 23.1 | 20 | 21.6 | 18.1 |
| Elongation (%) | 171 | 112 | 81 | 153 | 60 | 39 | 86 | 86 | 78 | 78 | presented in Table 1. Examples 3 through 8 and Comparative Example C2 have higher hard segment content than Examples 1, 2, and C1.

The results indicate that at 45 weight percent hard segment content, conventional polyols with conventional (high) levels of unsaturation, produce carpet backings with marginal elongation (60% minimum is desirable), and a tuft bind of 12.2 lbs (Comparative Example C1). By substituting an ultra-low unsaturation polyol (unsaturation of 0.0064 meq/g) for the conventional polyols, elongation is more than doubled, while tuft bind is simultaneously increased by 14% (Example 1). Raising the hard segment content should increase the tuft bind, and that this is so is illustrated by Comparative Example C2, where an increase in hard segment content to 53% from 45% results in a 36% increase in tuft bind. However, the elongation decreases to only 35%, and as a result the carpet is very stiff, has poor overall feel, and cracks upon bending. Such a carpet is not commercially acceptable. However, in Example 2, with the same hard segment content of 53%, use of ultra-low unsaturation polyols results in yet higher tuft bind, and an elongation which is still almost twice as good as the lower hard segment content control C1. This ability to obtain excellent tuft bind while also achieving higher elongation is most unexpected. Examples 5–8 exhibit excellent tuft bind while also exhibiting good elongation. These examples illustrate the added benefit of using both an ultra-low unsaturation polyol and 2-methyl-1,3-propanediol for improving tuft bind.

EXAMPLES 9–11 AND COMPARATIVE EXAMPLE C3

The procedure and materials of Example 1 are used to prepare additional polyurethane froth adhesives and carpets backed therewith. The functionalities of the polyols are varied at substantially the same hard segment content to assess the effect of functionality on elongation. MPDiol™ glycol is substituted for a portion of the total chain extender. Formulations and properties are presented in Table 2.

TABLE 2

| | Example | | | |
|---|---|---|---|---|
| | 9 | 10 | 11 | C3 |
| Component | | | | |
| Polyol A | 81 | 57 | 41 | — |
| Polyol B | — | — | — | 62.5 |
| Polyol C | — | — | — | 17.5 |
| Polyol D | — | 24 | 40 | — |
| Diethylene Glycol | 9.5 | 9.5 | 9.5 | 20 |
| MPDiol ™ Glycol | 9.5 | 9.5 | 9.5 | — |
| Calcium Carbonate | 150 | 150 | 150 | 150 |
| Wetting Agent | 1 | 1 | 1 | 1 |
| LC5615 | 1.5 | 1.5 | 1.5 | 1.5 |
| Baytuft 751 | 74.6 | 74.4 | 74.2 | 68.8 |
| Physical and Chemical Characteristics | | | | |
| Hard Segment Content | 53.5 | 53.5 | 53.5 | 53 |
| Elongation | 108 | 80 | 80 | 25 |
| Polyol Functionality | 1.98 | 2.22 | 2.39 | 2.41 |

These examples show that despite the teachings of U.S. Pat. Nos. 4,853,054 and 4,696,849, there is no need to limit polyol functionality to close to 2 when ultra-low unsaturation polyols are used. As the functionality is increased from 1.98 to 2.39, a modest decrease in elongation at constant hard segment content is observed, from 108 to 80, still quite acceptable (33% beyond minimum desired elongation). However, the Comparative Example C3, at substantially the same functionality as Example 11, has a totally unacceptable elongation of only 25%. Thus, processing latitude and physical properties are unexpectedly increased through the use of low unsaturation diols and co-use of 2-methyl-1,3-propanediol as chain extender.

EXAMPLE 12 AND COMPARATIVE EXAMPLES C4 AND C5

Polyurethane froth adhesives were prepared by frothing the ingredients listed in Table 3. The froths were applied to the reverse side of a 30 oz/yd² (1 kg/m²) level loop carpet of 1250 denier, 2-ply nylon fiber tufted through a woven polypropylene primary backing at 8×10 stitches per inch (~3×4 stitches per cm), in a straight stitch pattern. Elongation was measured from pads prepared by pouring a portion of the froth into pans and curing at 150° C. for 15 minutes. Physical properties are also listed in Table 3.

TABLE 3

| | Example | | |
|---|---|---|---|
| | C4 | C5 | 12 |
| Component | | | |
| Polyol B | 65.0 | 68.4 | 67.4 |
| Polyol C | 18.9 | 19.6 | 19.3 |
| Diethylene glycol | 15.2 | — | — |
| 1,3-propanediol | — | 12 | — |
| 2-methyl-1,3-propanediol | — | — | 13.4 |
| Wetting Agent | 1 | 1 | 1 |
| Calcium Carbonate | 150 | 150 | 150 |
| Ave. Polyol Functionality | 2.4 | 2.4 | 2.4 |
| LC5615 | 1.5 | 1.5 | 1.5 |
| Baytuft 751 | 54.9 | 59.7 | 56.8 |
| Physical and Chemical Characteristics | | | |
| % Hard Segment | 45 | 45 | 45 |
| Density (lb/ft³) | 32 | 29 | 30 |
| Tuft bind (lb) | 13.0 | 14.4 | 15.6 |
| Applied Weight (oz/yd²) | 35.6 | 34.6 | 33.8 |
| Tensile (psi) | 130 | 142 | 120 |
| Elongation (%) | 52 | 53 | 96 |
| Compression Set (25% @ 23° C.) | 18.5 | 16.2 | 5.2 |

As can be seen from the Examples, hard segment content, foam density, and applied coating weight were kept constant. Example 12, employing 2-methyl-1,3-propane diol as chain extender exhibited both higher tuft bind as well as higher elongation than similar formulations employing diethylene glycol and 1,3-Polyol propanediol as chain extenders. Both formulations employing the latter chain extenders exhibited elongation below the acceptable minimum of 60%. However, Example 12, employing 2-methyl-1,3-propane diol, exhibited much higher elongation. This higher elongation would permit increasing the hard segment content of the Example 12 formulation to further increase tuft bind before the elongation is reduced below the acceptable limit. Increasing the hard segment content of the Comparative Examples is not possible, as the elongation is less than desired with the present levels of chain extender.

EXAMPLE 13 AND COMPARATIVE EXAMPLE C6

The benefits of the subject invention formulations also extend to form cushioning which may optionally be applied following application of the precoat adhesive. In the Examples which follow, Polyol F is a conventionally catalyzed polyoxypropylene diol having a 19 weight percent polyoxyethylene cap, an unsaturation of 0.061 meq/g, an equivalent weight of 2000 Da, a nominal functionality of 2, and an actual functionality of 1.77.

Polyol G is a conventionally catalyzed polyoxypropylene triol with a 17% polyoxyathylene cap, an unsaturation of 0.073 meq/g, an equivalent weight of 2000 Da, a nominal functionality of 3, and an actual functionality of 2.26. Polyol H is an ultra-low unsaturation, 2000 Da equivalent weight polyoxypropylene diol with an internal random polyoxyethylene content of 5 weight percent, a 15 weight percent polyoxyethylene cap, an unsaturation of 0.007 meq/g, a nominal functionality of 2, and an actual functionality of 1.98.

The blend of polyols F and G reproduce polyol Blend A in examples 1 and 2 of U.S. Pat. No. 4,853,054. In each example, all components except the isocyanate were thoroughly mixed. Upon addition of the isocyanate, the blend was frothed in a Kitchenaid® mixer using a wire whip impeller for 5 minutes. The resulting froth was then applied to a polypropylene primary carpet backing and evenly gauged using a Gardner bar. The sample was cured for 12–15 minutes at 130° C. The attached cushion was removed from the backing to perform physical testing. The results are presented in Table 4.

TABLE 4

| | Example | |
|---|---|---|
| | C6 | 13 |
| Component | | |
| Polyol F | 45 | — |
| Polyol G | 45 | — |
| Polyol H | — | 90 |
| Diethylene glycol | 10 | 10 |
| Calcium Carbonate | 40 | 40 |
| Aluminum Trihydrate | 40 | 40 |
| LC5615 | 1.5 | 1.5 |
| Silicone Surfactant | 1.5 | 1.5 |
| Isonate 143L | 35.4 | 35.8 |
| Physical and Chemical Characteristics | | |
| Ave. Polyol Functionality | 2.02 | 1.98 |
| Density (pcf) | 29 | 31 |
| Thickness (mils) | 297 | 267 |
| Tensile Strength (psi) | 129 | 163 |
| Tear Strength (lbs/in) | 27.5 | 38.3 |
| Elongation (%) | 86 | 106 |

The results presented in Table 4 illustrate the dramatic improvement in tensile strength, tear strength, and elongation which may be obtained through use of the subject compositions for attached cushioning.

All molecular weights and equivalent weights herein are number average molecular weights and equivalent weights expressed in Daltons (Da) unless indicated otherwise. The term "major" means 50% by weight unless indicated otherwise, while the term "minor" means less than 50% by weight. The term "most major" means 75% by weight or more. The term "improvement" relative to tuft bind and elongation is meant an improvement compared to an otherwise similar formulation applied to the same greige good, this otherwise similar formulation containing a chain extender which does not comprise 2-methyl-1,3-propanediol and/or containing a conventional polyoxyalkylene polyether polyol with unsaturation characteristic of KOH catalyzed polyols of similar functionality, molecular weight, and polyoxypropylene/polyoxyethylene moiety distribution in lieu of a low unsaturation analog.

The term "precoat adhesive" is employed in the same sense as used by those skilled in the art, and means an adhesive applied directly to the tufts prior to application of any foam cushioning material. The precoat adhesive may be applied from a single puddle or from multiple puddles. The formulations employed in two puddle and multiple puddle systems need not be identical. At least one of the puddles must be a polyurethane adhesive of the subject invention. Preferably, any foam cushioning material applied after one or more precoats should also employ a polyurethane system in accordance with the present teachings. Cushioning foams generally have somewhat lower hard segment content, i.e., in the range of 20% to 40% and lower filler loadings as well. The necessary components of the present invention may be used to the exclusion of ingredients listed as optional or not disclosed.

Having now fully described the invention, it will be apparent to one of ordinary skill in the art that many changes and modifications can be made thereto without departing from the spirit or scope of the invention as set forth herein.

What is claimed is:

1. A frothed polyurethane foam comprising the reaction product of:
   (a) a polyisocyanate and
   (b) a polyol component having an average functionality of about 1.9 to about 3, and comprising:
       (i) at least one polyoxyalkylene polyol containing a major amount of oxypropylene moieties and having an unsaturation of less than about 0.015 meq/g, an equivalent weight of from about 800 Da to about 5000 Da, and a nominal functionality of from 2 to 8; and
       (ii) at least one chain extender in the presence of
   (c) at least one catalysts and
   (d) a solid particulate filler in an amount of from about 50 to about 350 parts by weight, based upon 100 parts by weight of components (a) and (b).

2. The frothed polyurethane foam of claim 1, wherein (b)(ii) said chain extenders are isocyanate-reactive compounds having between 2 and 3 isocyanate-reactive groups per molecule, and an equivalent weight ranging from about 31 Da to about 250 Da.

3. The frothed polyurethane foam of claim 1, wherein (b)(ii) said chain extender is selected from the group consisting of 2-methyl-1,3-propane diol, ethylene glycol, diethylene glycol, triethylene glycol, propylene glycol, dipropylene glycol, tripropylene glycol, 1,3-propanediol, 1,4-butanediol, 1,6-hexanediol, 2,2,4-trimethylpentanediol, glycerine and trimethylolpropane.

4. The frothed polyurethane foam of claim 1, wherein (b)(i) at least one of said one or more polyoxyalkylene polyols is a polyoxypropylene polyol having a nominal functionality of 2 or 3 and a content of oxyethylene moieties of up to about 30 weight percent.

5. The frothed polyurethane foam of claim 4, wherein (b)(i) said polyoxypropylene polyol contains random internal oxyethylene moieties.

6. The frothed polyurethane foam of claim 4, wherein said oxyethylene moieties are present as a polyoxyethylene cap.

7. The frothed polyurethane foam of claim 4, wherein (b)(i) said polyoxypropylene polyol contains both random internal oxyethylene moieties and a polyoxyethylene cap.

8. The frothed polyurethane foam of claim 1, wherein (b) said polyol component has an unsaturation of less than about 0.010 meq/g.

9. The frothed polyurethane foam of claim 1, wherein (b) said polyol component has an average actual functionality in the range of 1.95 to 2.6.

10. The frothed polyurethane foam of claim 1, wherein (b) said polyol component has an average actual functionality in the range of 1.95 to 2.4.

11. The frothed polyurethane foam of claim 1, wherein a portion of (b) said polyol component comprises a polymer polyol comprising a dispersion of a solid polymer component in one or more polyoxyalkylene polyols.

12. The frothed polyurethane foam of claim 1, wherein said foam is mechanically frothed in the presence of at least one inert gas.

13. The frothed polyurethane foam of claim 1, wherein said foam is frothed employing at least in part a blowing agent.

14. A carpet underlay comprising:
   (a) a primary backing, and
   (b) the frothed polyurethane foam of claim 1, wherein the frothed foam is attached to the primary backing.

15. A tufted good comprising:
   (a) a greige good comprising one or more fibers tufted into a primary backing, said greige good having a face surface and a back surface, and
   (b) the frothed polyurethane foam of claim 1, wherein said frothed polyurethane foam is attached to the back surface of the greige good.

16. A process for the preparation of a frothed foam comprising:
   (1) introducing a frothable polyurethane reactive mixture comprising:
       (a) a polyisocyanate component;
       (b) a polyol component having an average functionality of about 1.9 to about 3, and comprising:
           (i) at least one polyoxyalkylene polyol containing a major amount of oxypropylene moieties and having an unsaturation of less than about 0.015 meq/g, an equivalent weight of from about 800 Da to about 5000 Da, and a nominal functionality of from 2 to 8; and
           (ii) at least one chain extender;
       (c) at least one catalyst; and
   (d) a solid particulate filler in an amount of from about 50 to about 350 parts by weight, based upon 100 parts by weight of components (a) and (b);
   (2) delivering said frothable polyurethane reactive mixture to a froth foaming head; and
   (3) frothing said frothable polyurethane reactive mixture to form a frothed polyurethane foam.

17. The process of claim 16, wherein (b)(ii) said chain extenders are isocyanate-reactive compounds having between 2 and 3 isocyanate-reactive groups per molecule, and have an equivalent weight ranging from about 31 Da to about 250 Da.

18. The process of claim 16, wherein (b)(ii) said chain extender is selected from the group consisting of 2-methyl-1,3-propane diol, ethylene glycol, diethylene glycol, triethylene glycol, propylene glycol, dipropylene glycol, tripropylene glycol, 1,3-propanediol, 1,4-butane diol, 1,6-hexanediol, 2,2,4-trimethylpentanediol, glycerine and trimethylolpropane.

19. The process of claim 16, wherein (b)(i) at least one of said one or more polyoxyalkylene polyols is a polyoxypropylene polyol having a nominal functionality of 2 or 3 and a content of oxyethylene moieties of up to about 30 weight percent.

20. The process of claim 19, wherein (b)(i) said polyoxypropylene polyol contains random internal oxyethylene moieties.

21. The process of claim 19, wherein (b)(i) said oxyethylene moieties are present as a polyoxyethylene cap.

22. The process of claim 19, wherein (b)(i) said polyoxypropylene polyol contains both random internal oxyethylene moieties and a polyoxyethylene cap.

23. The process of claim 16, wherein (b) said polyol component has an unsaturation of less than about 0.010 meq/g.

24. The process of claim 16, wherein (b) said polyol component has an average actual functionality in the range of 1.95 to 2.6.

25. The process of claim 16, wherein (b) said polyol component has an average actual functionality in the range of 1.95 to 2.4.

26. The process of claim 16, wherein a portion of (b) said polyol component comprises a polymer polyol comprising a dispersion of a solid polymer component in one or more polyoxyalkylene polyols.

27. The process of claim 16, wherein said foam is mechanically frothed in the presence of at least one inert gas.

28. The process of claim 16, wherein said foam is frothed employing at least in part a blowing agent.

29. A process for the production of a carpet underlay comprising:

(1) applying the frothed polyurethane foam of claim 1 to a primary backing, and (2) curing the frothed foam.

30. A process for the production of a tufted good comprising:

(1) applying the frothed polyurethane foam of claim 1 to a greige good, and (2) curing the frothed foam.

* * * * *